No. 725,326. PATENTED APR. 14, 1903.
G. J. DORMANDY.
MACHINE FOR FOLDING COLLAR BLANKS, &c.
APPLICATION FILED AUG. 7, 1900.
NO MODEL. 6 SHEETS—SHEET 1.

WITNESSES
INVENTOR

No. 725,326. PATENTED APR. 14, 1903.
G. J. DORMANDY.
MACHINE FOR FOLDING COLLAR BLANKS, &c.
APPLICATION FILED AUG. 7, 1900.
NO MODEL. 6 SHEETS—SHEET 2.

WITNESSES
William A. Sweet
Charles S. Bruntnall

INVENTOR
Harry J. Dormandy
by W E Hagan atty

No. 725,326. PATENTED APR. 14, 1903.
G. J. DORMANDY.
MACHINE FOR FOLDING COLLAR BLANKS, &c.
APPLICATION FILED AUG. 7, 1900.
NO MODEL. 6 SHEETS—SHEET 3.

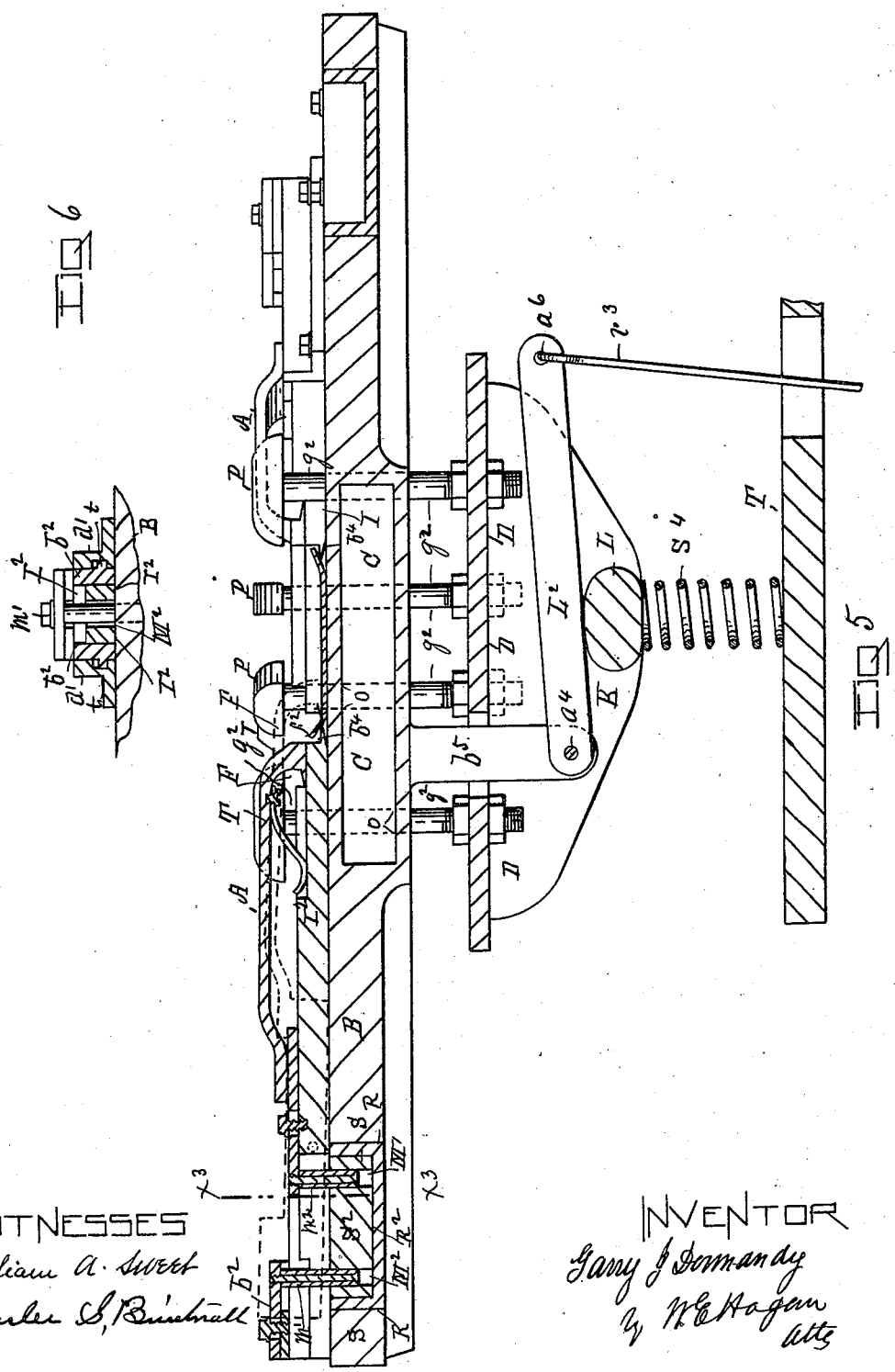

No. 725,326. PATENTED APR. 14, 1903.
G. J. DORMANDY.
MACHINE FOR FOLDING COLLAR BLANKS, &c.
APPLICATION FILED AUG. 7, 1900.
NO MODEL. 6 SHEETS—SHEET 5.
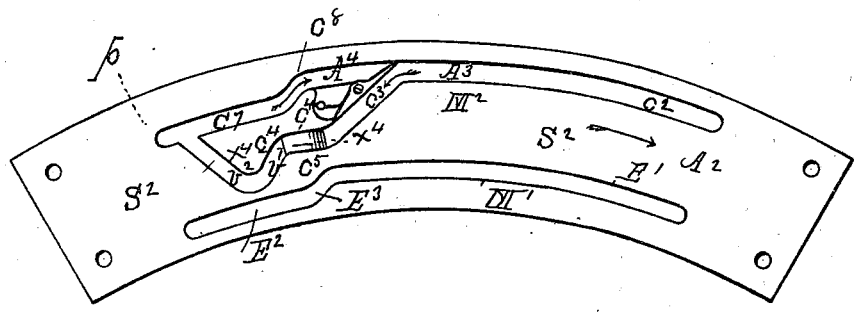
FIG. 7
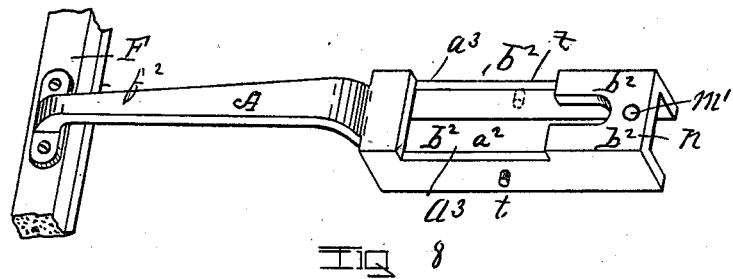
FIG. 8
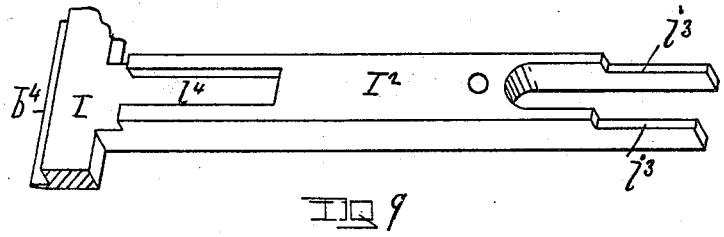
FIG. 9
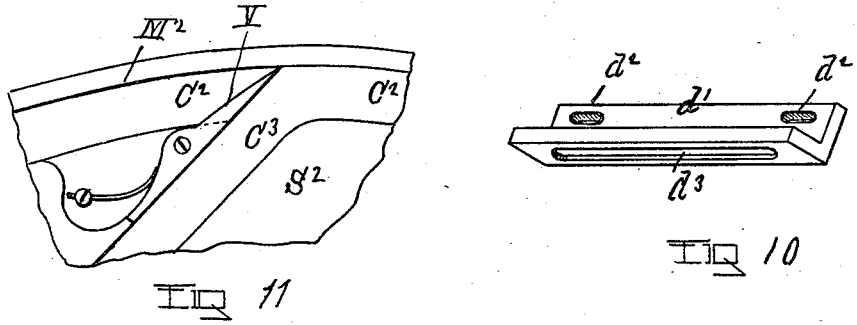
FIG. 11
FIG. 10
WITNESSES
William A. Sweet
Charles S. Brintnall
INVENTOR
Larry J. Dormandy
By W. E. Hagan atty No. 725,326. PATENTED APR. 14, 1903.
G. J. DORMANDY.
MACHINE FOR FOLDING COLLAR BLANKS, &c.
APPLICATION FILED AUG. 7, 1900.
NO MODEL. 6 SHEETS—SHEET 6.

WITNESSES
William A. Sweet
Charles S. Brintnall

INVENTOR
Garry J. Dormandy
by W.E. Hagan
Atty

UNITED STATES PATENT OFFICE.

GARRY J. DORMANDY, OF LANSINGBURG, NEW YORK, ASSIGNOR TO THE UNITED SHIRT AND COLLAR COMPANY, OF LANSINGBURG, NEW YORK.

MACHINE FOR FOLDING COLLAR-BLANKS, &c.

SPECIFICATION forming part of Letters Patent No. 725,326, dated April 14, 1903.

Application filed August 7, 1900. Serial No. 26,148. (No model.)

*To all whom it may concern:*

Be it known that I, GARRY J. DORMANDY, a citizen of the United States, residing in Lansingburg, county of Rensselaer, and State of New York, have invented certain new and useful Improvements in Machines for Inturning the Edges of Blanks for Cuffs or Like Articles, of which the following is a specification.

My invention relates to machines for inturning the edges of cuff-blanks or like articles, and more particularly to mechanisms and parts for effecting the folding and pressing of the folds of blanks to form the two parts of a cuff or analogous article preparatory to sewing such parts together.

One of the principal objects of my invention is to produce a machine that will afford a more simple operation, and more particularly by doing away with the expanding and contracting templet heretofore usually employed in folding-machines and substituting therefor other parts for performing analogous functions thereto and in the herein-described example of my invention substituting such parts as may be operated by one and the same means with the infolders, so that at least one manual operation may be dispensed with.

I will first describe a folding-machine embodying my invention and then point out the novel features in a claim.

Figure 1:
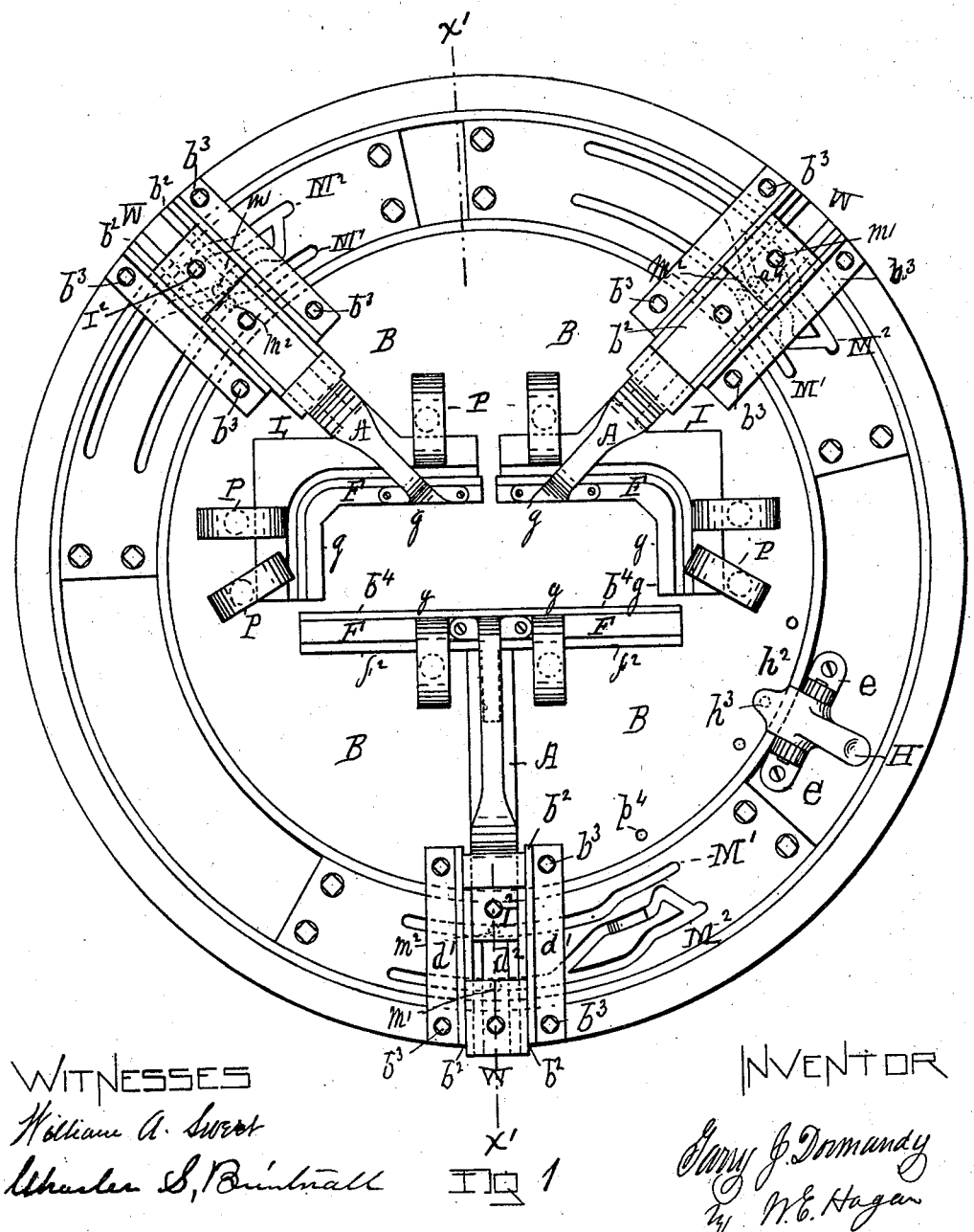
Figure 2:
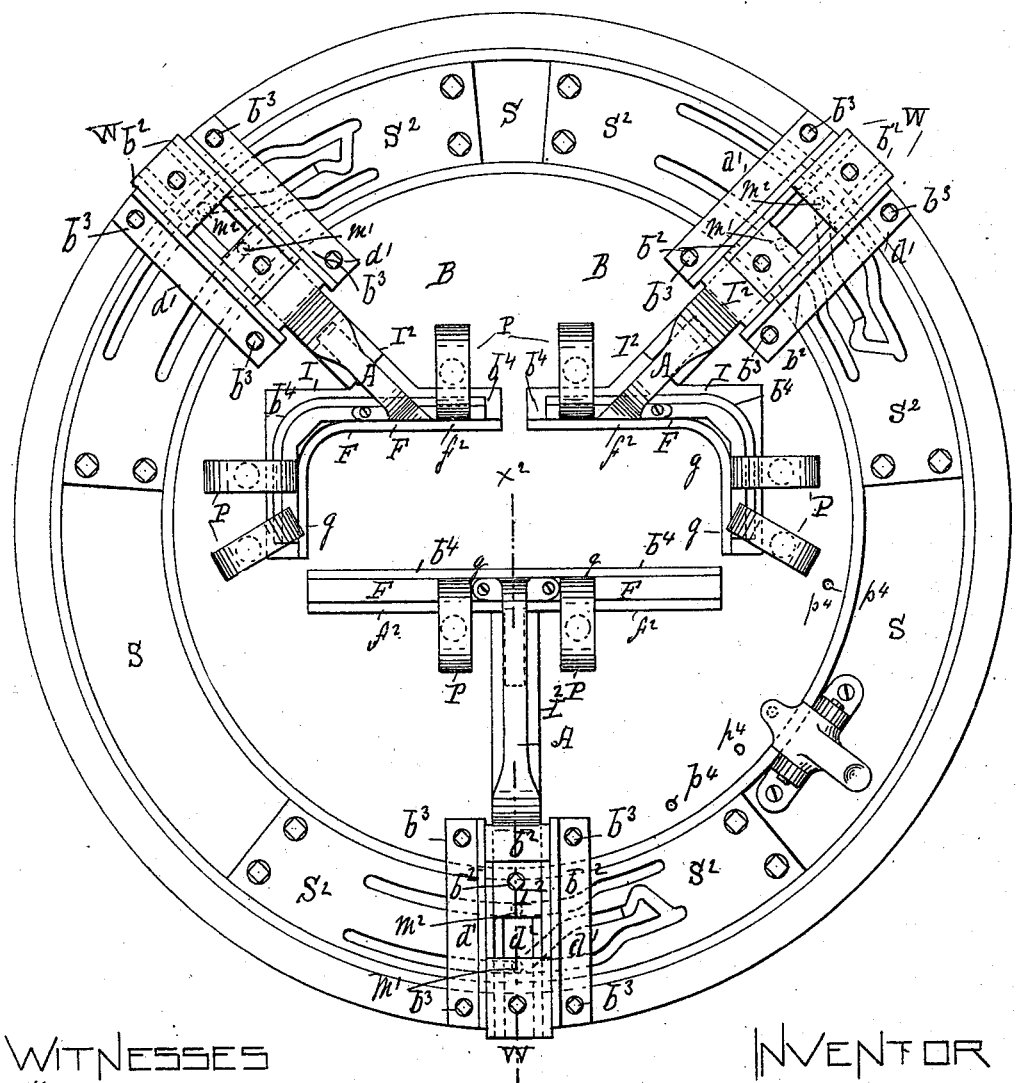
Figure 3:
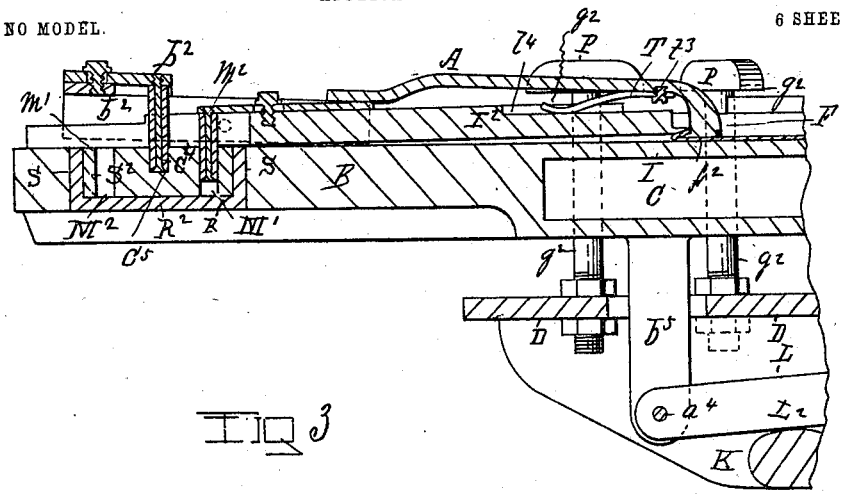
Figure 4:
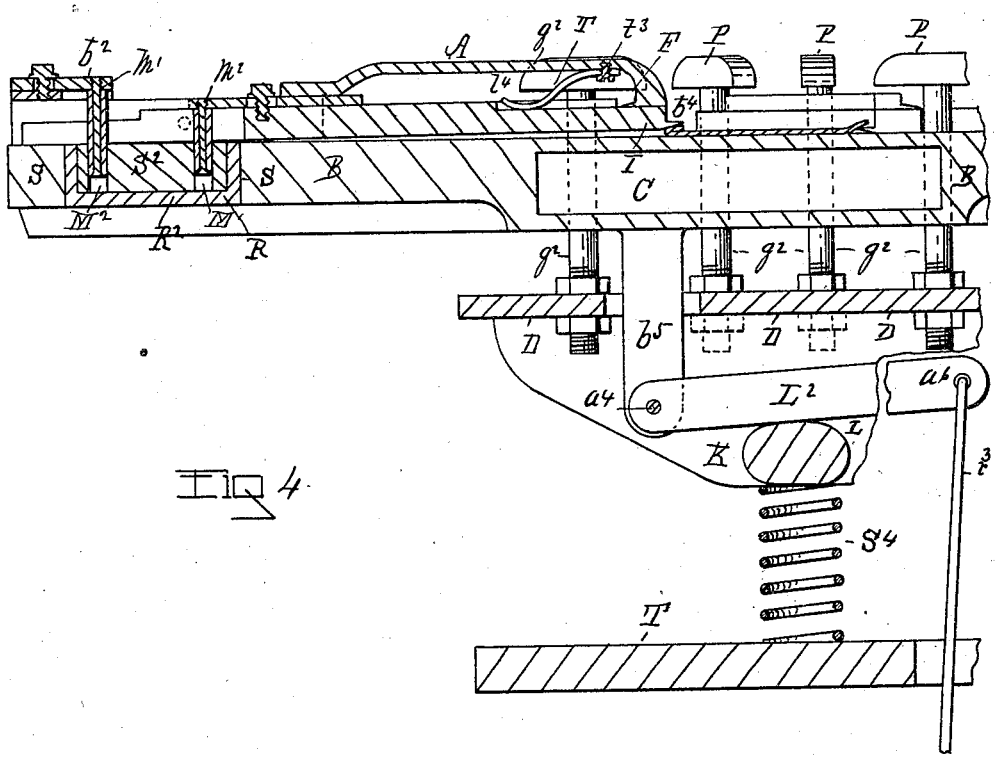
Figure 13:
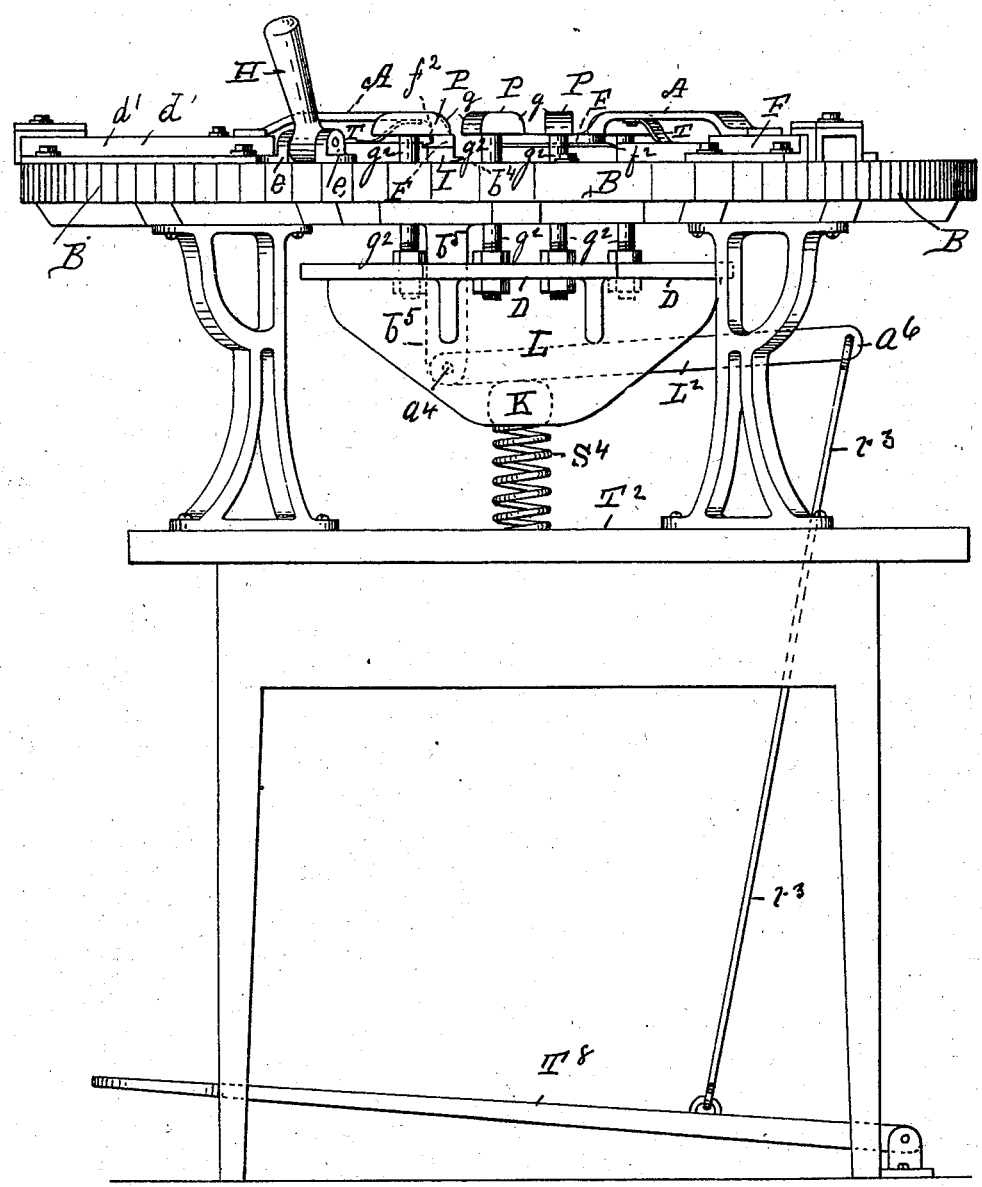
Figure 12:
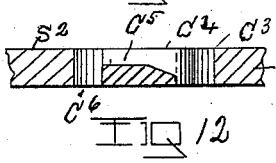

In the accompanying drawings, Figure 1 is a top view of a machine embodying my invention, the machine illustrated being designed to operate upon a cuff having two round corners and two square corners by means of two L-shaped infolders and a straight bottom infolder. The parts are shown in their positions at the beginning of an operation. Fig. 2 is a view similar to Fig. 1 with certain parts in different positions or stages of operation. Fig. 3 is a sectional elevation taken on the line $x'\ x'$ of Fig. 1, parts of the pressing mechanism being shown in elevation and the folding mechanism shown in an intermediate stage of the operation, the fold in the blanks having just been formed. Fig. 4 is a view similar to Fig. 3, the parts shown in a more advanced stage, the folds completed and ready to be pressed. Fig. 5 is a section taken on the line $x^2\ x^2$ of Fig. 2, the parts shown before operation and a blank in position. Fig. 6 is a section taken on the line $x^3\ x^3$ of Fig. 5. Fig. 7 is a top view of one of the segments. Fig. 8 is a perspective of one of the pattern-gages with its slide-bar and connecting-arm, the pattern-gage shown in part only. Fig. 9 is a perspective of one of the infolder slide-bars with a part of the connected infolder. Fig. 10 is a perspective of one of the angle-bars which may be employed to form a movable slideway on the machine-bed. Fig. 11 is a partial top view of one of the segments, showing the switch employed in the cam-slot. Fig. 12 is a section taken on the line $x^4\ x^4$ of Fig. 7. Fig. 13 is a side view of the complete machine illustrated in Fig. 1.

Like letters of reference are employed to designate corresponding parts in the several figures.

B designates the bed of a machine embodying my invention constituting a support for the blanks during the infolding and pressing operations.

C designates a chamber beneath the top of the bed, whereby the latter may be heated by steam supplied to the chamber or by other suitable means.

S designates an annular slideway provided in the bed to constitute a bearing for a ring or slide R. The ring is movable in the slideway, its function being, through means to be described, to operate the folding mechanism. Since the purpose of the ring is to constitute a slide, I do not wish to limit myself to a circular slide, but when employing the term "ring" to cover equivalent constructions—as, for example, a number of segments or slides arranged without the center portion of the bed and connected so that they may be moved in unison, the slideway S to be constructed to provide suitable bearing-surfaces for such segments or slides.

To operate the infolding mechanism, may be employed cams actuated by the ring R. For this purpose cam-segments $S^2$ are provided, suitably attached to the ring R, as by means of the recess $R^2$ in the ring. With this construction the ring will preferably be moved to and fro to actuate the cams, and a handle H may conveniently be provided for this purpose. This handle is shown pivotally connected to the ring through ears $e\ e$ and is provided with a pin $h^3$ upon a lug $h^2$, the pin adapted to engage with holes or sinks $p^4$ in the bed to lock the ring or to regulate the positions at which the segments shall start or stop.

In employing the terms "inward" or "outward" or allied expressions throughout this specification and the claims I mean inward or outward relatively to the operative center of the bed or to that edge portion of the blank under operation.

I represents infolders, provided at the inner sides thereof with infolder-blades $b^4$. Other forms of infolders may be employed—as, for example, comprising rollers—when desired. The infolders will be fitted to move inwardly and outwardly by means to be described hereinafter.

In place of the expanding and contracting templet usually employed I have in this instance of my invention shown what I term "pattern-gages" F, of which there are usually as many as there are infolders, though there may be more or less. The pattern-gage may comprise a pattern-stock, to which the pattern-blade $f$ is attached in any suitable manner. The pattern-blade will be located at the outward side of the stock and adapted to be positioned upon the blanks and to bear directly thereon during the infolding of the contiguous edge portion of the blanks. The pattern-gage, like the infolders, is fitted to move inwardly and outwardly by means of mechanism located outward of the gage. It may be considered the analogue of one of the plates of the templet or die frequently employed in that both are shaped to the desired pattern or portion of such pattern and have the corresponding blank edge folded over it.

To guide the infolders and pattern-gages in their movements, I prefer to employ slideways, and particularly such as are formed by angle-irons $d'$ $d'$, adjustably connected to the bed through slots $d^2$ and bolts $b^3$. While it is obviously not essential, I have shown an infolder with its corresponding pattern-gage guided by slide-bars located between a single pair of angle-irons $d'$ $d'$. This is conveniently done by superimposing one of the slide-bars upon the other.

$b^2$ represents a slide-bar connected to the pattern-gage F through curved arm A. This slide-bar engages the angle-iron $d'$ at each side and is provided with pins $t$ at the sides, adapted to engage grooves $d^3$, formed on the inner side of the angle-irons. (See Figs. 8 and 10.) The object of these pins is to permit a rocking movement of the slide-bar for a purpose to be described hereinafter.

$I^2$ represents an infolder slide-bar. This slide-bar engages a longitudinal slideway $a^2$, formed in the slide-bar $b^2$, the latter being recessed at $a^3$, as shown at Fig. 8. The slide-bar $I^2$ is cut away at $l^3$ to permit an outward movement of the slide-bar $I^2$ relatively to the slide-bar $b^2$, rendered necessary by the presence of a top or cross piece $n$ of slide-bar $b^2$.

It will be seen from the foregoing description that the slide-bars $I^2$ and $b^2$ are independently movable inwardly and outwardly, the latter slide-bar and the arm A being directly above the former. Means may be employed to sustain the gage against gravity—for example, the leaf-spring T, connected to the arm A and curved downwardly to engage a recess $l^4$, formed in the slide-bar $I^2$.

The parts just described are so arranged that when an infolder is moved outward and the corresponding pattern-gage is moved inward the pattern-blade will pass beyond the infolder-blade, so that it may be lowered against the force of spring T to rest directly on the blank within the infolder-blade, and the latter may then be moved inwardly to infold the blank edge over the pattern-blade. I will now describe the means for effecting these operations.

$m^2$ represents a pin connected to the slide-bar $I^2$ and projected into a cam-slot $M'$, provided in the cam-segment $S^2$. The slot $M'$ has concentric portions $E'$ and $E^2$ and an eccentric portion $E^3$, so that when the ring R is moved the eccentric portion may be brought into play to actuate the infolder attached to the slide-bar $I^2$.

$m'$ represents a pin connected to the slide-bar $b^2$ and projected therefrom into a cam-slot $M^2$, provided for convenience in the same cam-segment $S^2$ in which the cam-slot $M'$ is formed. The cam-slot $M^2$ is provided with concentric portions $C^7$ and $C^2$, corresponding with concentric portions $E^2$ and $E'$ of cam $M'$, and eccentric portion $C^3$, corresponding with eccentric portion $E^3$ of cam $M'$, so that the slide-pins $m'$ and $m^2$ may be engaged at the same time with the eccentric portions. The cam-slot $M^2$ is further provided with the following: an eccentric branch $C^3$, having a spring-actuated switch Y to turn the cam-pin $m'$ inward into the branch $C^3$ as the cam-segment moves in one direction. Succeeding this is a concentric portion $C^4$. This portion $C^4$ is provided with a cam $C^5$, (see Fig. 12,) which has, first, an upwardly-inclined portion for vertically moving the cam-pin $m'$ to effect the rocking of the slide-bar $b^2$, as before mentioned, and, second, a straight portion which corresponds in position with the eccentric part $E^3$ of the cam-slot $M'$. Succeeding the portion $C^4$ and the cam $C^5$ is the V-shaped portion $C^6$ of the cam-slot $M^2$, consisting of the eccentric portions $v'$ and $v^2$, adapted to carry the pin $m'$ first inwardly then outwardly into the first-named concentric portion $C^7$.

I will now describe the operation of the above-described parts, referring mainly to Fig. 1, in which the parts are shown in their starting positions. The pin $h^3$ of the handle H is in the middle of the sinks $p^4$. Releasing the pin from the sink, the handle may be moved to right or left, the ring having two ranges of movement—that to the right for effecting the operation of the two upper infolders with their pattern-gages and that to the left for effecting the operation of the bottom infolder. In its movements to and from in the right-hand range the ring cannot actuate the bottom infolder, as the pins $m'$ and $m^2$ remain in the concentric portions $E'$ $C^2$ of camslots $M'$ $M^2$. (See Fig. 7.) When the ring is oscillated in the left-hand range, the operative portions of the cams $M'$ $M^2$ of the bottom infolder come in turn into play, the other infolders being then inoperative. The purpose of thus operating the infolders in series is to permit the formation of what has become known as a "lock-corner" or "locked corner"—that is, if in one blank the bottom infolder is operated first before the others and in the next blank the bottom infolder is operated last the two blanks thus formed will fit into each other or interlock at the square corners. There are other forms of lock-corner blanks than that producible on the present machine and other methods of forming lockcorners, and my invention is clearly applicable to any of these or to any work that can be done on folding-machines for cuffs, collars, bosoms, or analogous articles. The infolders may, for example, be operated simultaneously by providing similar cam-segments for all. To return to the operation. Before the handle is moved a blank, consisting of one or more thicknesses of material, is placed on the bed within the infolders and resting on the blades of the infolders, as shown at Fig. 5. When the handle is moved forward to the right, the cam-pins $m'$ of the upper pattern-gages will first be switched into the eccentric part $C^3$ of cam $M^2$. This, actuating the cam-pin, moves the slide-bar $b^2$ and pattern-gage F inwardly beyond the infolder, as shown at Fig. 2. As the forward movement to the right continues the cam-pin $m'$ enters the concentric slot portion $C^4$, striking the incline which begins the cam $C^5$, and elevated by said cam to rock the slide-bar $b^2$, and thus lower the pattern-gage upon the bed or upon a blank, as shown by the dotted lines in Fig. 5. Immediately after this the infolder is operated, the cam-pin $m^2$, which has heretofore rested in the concentric slot portion $E'$, being actuated by the eccentric portion $E^3$ to move the infolder I inwardly to carry the contiguous edge of the blank over the edge of the pattern-blade. This stage is illustrated at Fig. 3. During the remainder of the forward movement of the ring the cam $C^5$ passes beyond the pin $m'$, which is then actuated by the slot portion $v'$ to throw the pattern-stock inwardly again beyond the infolder to permit the pattern-stock to rise under the action of spring T from the bed and blank, after which the slot portion $v^2$ actuates the pattern-stock to move outwardly until the pin $m'$ is stopped by the end of the concentric portion $C^7$. It is at this stage and before the infolders have been moved outwardly that I prefer to press the infold so formed, when pressing is necessary, by suitable means, to be described hereinafter, or any equivalent thereof. In the return movement of the ring the parts are brought back to the starting position of Fig. 1, the pin $m'$ remaining in the slot portion $C^7$ until actuated by the eccentric portion $C^8$, which moves the pin $m'$ outwardly simultaneously, for convenience, with the outward movement of pin $m^2$, actuated by the portion $E^3$ of camslot $M'$, and pin $m'$ then passes the switch Y, completing the circuit indicated by the arrows $A^3$ $A^4$, Fig. 7. Arrow $A^2$ indicates the direction of the forward movement of the cam-segment. After the return movement the segment will preferably be moved continuously beyond the middle position—that is, by moving the handle to the left in Fig. 1—to operate such infolders as were not operated in the first oscillation of the ring. During this movement there will be a repetition of the above-mentioned operations in connection with such other infolders and corresponding pattern-gages.

I wish to cover the present invention most broadly and not to be limited to any one or more of the specific mechanisms shown, as there are many equivalent substitutes obvious or already in the art. For example, there may be two rings for actuating the infolder and pattern-gages, the two actuated separately or by single means, or a ring be dispensed with in favor of other operating mechanisms. Means may be employed to clamp or hold a blank in place during the operations, if it be desirable, as where the expedient old in the art be employed to accomplish folding by holding stationary the so-called "infolder" and forcing the blank beneath it. Other lowering means also for the patterngage may be employed than the cam $C^5$ for producing a rocking movement of the slidebar $b^2$, nor is it necessary that this cam act upon the pin $m'$.

I will now describe a pressing mechanism which may be employed in connection with the infolding mechanisms hereinbefore described.

P represents pressers which comprise heads $g$ and for each head a downwardly-projected rod $g^2$, passing through holes in the bed. The heads $g$ are arranged to extend over infolders. The rods $g^2$ are connected to a platform D in an adjustable manner by means of bolts. The platform D is provided with a cross-bar K, supported by downwardly-projecting brackets L.

$S^4$ represents a spring tending to elevate the platform D by acting on the cross-bar K, and the lower end of the spring $S^4$ may rest upon the table $T^2$, upon which the machine stands.

$L^2$ represents a lever pivoted to a bracket $b^5$ at $a^4$ and adapted to bear upon cross-bar K.

$r^3$ represents a rod pivoted at $a^6$ to the free end of lever $L^2$, which rod is attached at its lower end to a treadle $T^3$, provided in the table $T^2$. When the treadle is depressed, it effects the lowering of the platform D and all the pressers P to force the infolders, which are moved inwardly downwardly against the bed to crease or fix with a sharp fold the edges of the blank beneath such infolders. The bed or support may be fitted at the central portion, for example, to receive a vertical movement, this to serve as an alternative pressing method or other purpose—as, for example, where it is not desired to construct the pattern-blades to be elevated clear of the support it would assist in removing blanks from the machine.

What I claim as my invention is—

1. In an infolding-machine for cuff-blanks or analogous articles, the combination of a support for the blanks to be infolded, a plurality of pattern-gages for collectively defining the blanks to be infolded upon said support, each pattern-gage constructed and fitted to move inwardly and outwardly and having edge portions adapted to bear directly upon the blanks upon said support, and for each pattern-gage the following elements; an infolder constructed and fitted to move inwardly and outwardly for folding edge portions of the blanks over edge portions of the pattern-gage, mechanism for operating the pattern-gage whereby it may be positioned upon the blanks and within edge portions of the blanks and after the infold is formed moved inwardly to withdraw it from such infold, and a to-and-fro part for effecting such operations of the pattern-gage and infolder.

2. In an infolding-machine for cuff-blanks or analogous articles the combination of a support for the blanks to be infolded, and mechanism for infolding the blanks, so constructed and arranged that a templet the form of and substantially coextensive with the blanks may be dispensed with, said mechanism comprising pattern-gages constructed and fitted to move inwardly and outwardly and having edge portions adapted to bear directly upon the blanks and within edge portions of the blanks, positioning mechanisms for pattern-gages located outward of the respective pattern-gages, and comprising inwardly-extending, pattern-gage-supporting arms, and infolders constructed and fitted to move inwardly and outwardly to fold edge portions of the blanks over edge portions of pattern-gages.

3. In an infolding-machine for cuff-blanks or analogous articles the combination of a support for the blanks to be infolded, and mechanism for infolding blanks, so constructed that a templet the form of and substantially coextensive with the blanks may be dispensed with, said mechanism comprising pattern-gages constructed and fitted to move inwardly and outwardly and having edge portions adapted to bear directly upon the blanks upon said support and within edge portions of the blanks, positioning mechanisms for the pattern-gages located outward of the several gages, infolders constructed and fitted to move inwardly and outwardly to infold edge portions of the blanks over edge portions of the pattern-gages and a single part for effecting the operations of pattern-gages and infolders.

4. In a machine for infolding cuff-blanks or analogous articles the combination of a support for the blanks to be infolded, pattern-gages constructed and fitted to move inwardly and outwardly, actuating mechanism for pattern-gages located outwardly of the respective pattern-gages, infolders adapted to coact with pattern-gages for effecting the infolding of the contiguous edge portions of the blanks, means for producing a relative vertical movement between the said support and pattern-gages whereby pattern-gages may be caused to bear directly upon the blanks upon the support during the infolding of edge portions of the blanks, and the pattern-gages may be separated from the blanks after the pattern-gages are withdrawn from the infolds of the blanks, so that the folded blanks may be removed from the support.

5. In an infolding-machine for cuff-blanks or analogous articles the combination of a support for the blanks to be infolded, a pattern-gage constructed and fitted to move inwardly and outwardly and having edge portions adapted to bear directly upon the blanks upon the support, means comprising a pattern-gage-supporting arm that extends over an infolder, for moving the pattern-gage inwardly from the normal to position it directly upon the blanks and within edge portions of the blanks, and said infolder, the same constructed and fitted to move inwardly and outwardly for folding edge portions of the blanks over edge portions of the pattern-gage.

6. In an infolding-machine for cuff-blanks or analogous articles the combination of a support for the blanks to be infolded, a pattern-gage constructed and fitted to move inwardly and outwardly and having edge portions adapted to bear directly upon the blanks upon said support, an infolder constructed and fitted to move inwardly and outwardly, means for moving the pattern-gage inwardly to position it upon the blanks upon said support and within edge portions of the blanks, means for operating the infolder whereby edge portions of the blanks may be folded over edge portions of the pattern-gage and means whereby the pattern-gage is again moved inwardly to remove it from the fold of the blanks, the said pattern-gage-moving means comprising actuating devices located on the machine outwardly of the blanks to be infolded, and an arm extending inwardly therefrom, connected to said pattern-gage.

7. In an infolding-machine for cuff-blanks or analogous articles, the combination of a support for the blanks to be infolded, a pattern-gage constructed and fitted to move inwardly and outwardly and having edge portions adapted to bear directly upon the blanks upon said support, and infolder constructed and fitted to move inwardly and outwardly and mechanism for operating the pattern-gage whereby it may be first moved inwardly to position it upon, and within edge portions of the blanks, and there pause, the infolder adapted to be operated at this time to fold edge portions of the blanks over edge portions of the pattern-gage, the pattern-gage then moved farther inwardly to remove it from the folds of the blanks, and then moved outwardly to its original position.

8. In an infolding-machine for cuff-blanks or analogous articles the combination of a support for the blanks to be infolded, a pattern-gage having edge portions adapted to bear directly upon the blanks upon said support, said pattern-gage constructed and fitted to move inwardly and outwardly, and also toward and from said support, whereby it may be positioned upon the blanks within edge portions thereof, an infolder constructed and fitted to move inwardly and outwardly to infold edge portions of the blanks over edge portions of the pattern-gage, a part fitted to move to and fro, means actuated by said part for effecting the inward and outward movements of the pattern-gage, means actuated by said part for effecting the movements of the pattern-gage toward and from said support, and means actuated by said part for effecting the inward and outward movements of the infolder.

9. In an infolding-machine for cuff-blanks or analogous articles, the combination of a support for the blanks to be infolded, pattern-gages having edge portions adapted to bear directly upon the blanks upon said support, infolders for folding edge portions of the blanks over edge portions of pattern-gages, a plurality of slideways each slideway having two slide-bars therein fitted to move inwardly and outwardly, an infolder being connected to one slide-bar, an arm, as A, connecting a pattern-gage with the other slide-bar, the said arm located above the said infolder slide-bar and capable of being lowered and raised at the end thereof to which the pattern-gage is connected and means for actuating the slide-bars.

10. In an infolding-machine for cuff-blanks or analogous articles the combination of a support for the blanks, a pattern-gage having edge portions adapted to bear directly upon the blanks upon said support, a slide-bar connected to said pattern-gage fitted to move inwardly and outwardly, and provided with a pivot intermediate the slide-bar and machine-frame to permit a vertical rocking movement of the slide-bar, an infolder fitted to move inwardly and outwardly, a part for effecting the inward and outward movements of said infolder to infold edge portions of the blanks over edge portions of the pattern-gage, means actuated by said part for effecting the inward and outward movements of said pattern-gage slide-bar, and means actuated by said part for effecting the rocking of said slide-bar, whereby the pattern-gage may be positioned upon and moved from the blanks.

11. In an infolding-machine for cuff-blanks or analogous articles the combination of a support for the blanks to be infolded, pattern-gages adapted to bear directly upon the blanks upon said support and within edge portions thereof and constructed and fitted to move inwardly and outwardly, and also to move downwardly and upwardly, infolders fitted to move inwardly and outwardly to infold edge portions of the blanks over edge portions of pattern-gages, a cam for effecting the inward and outward movements of infolders, a cam for effecting the inward and outward movements of pattern-gages, a cam for effecting the downward and upward movements of such pattern-gages, and means for operating said cams whereby pattern-gages may be moved inwardly and downwardly to position such pattern-gages upon the blanks, the corresponding infolders operated, and the pattern-gages moved inwardly, from the folds, upwardly and outwardly.

12. In an infolding-machine for cuff-blanks or analogous articles, the combination of a support for the blanks, a slideway having a slide-bar therein, and a second slide-bar within the first-named slide-bar, said slide-bars adapted to move inwardly and outwardly, and one thereof fitted also to receive a rocking movement through a pivot, a pattern-gage having edge portions adapted to bear directly upon the blanks upon said support and connected to said rocking slide-bar, an infolder connected to the other slide-bar, a ring, and cams intermediate the ring and slide-bars, whereby the pattern-gage may be positioned upon the blanks, edge portions of the blanks folded over edge portions of the pattern-gage, and the pattern-gage moved inwardly from out the folds of the blanks and means for actuating the ring.

13. In an infolding-machine for cuff-blanks or analogous articles, the combination of a support for the blanks to be infolded, a pattern-gage constructed and fitted to move inwardly and outwardly and capable of an up-and-down movement relatively to the support, the said pattern-gage having edge portions adapted to bear directly upon the blanks upon said support, an infolder constructed and fitted to move inwardly and outwardly, and cams actuated by a single part for effecting operations substantially as follows: the pattern-gage moved inwardly and downwardly toward the support to bear upon the blanks, then the infolder moved inwardly to infold edge portions of the blanks over edge portions of the pattern-gage, then the pattern-gage moved inwardly to withdraw from the folds of the blanks, and after that the pattern-gage moved upwardly from the blanks and outwardly and the infolder moved outwardly.

14. In an infolding-machine for cuff-blanks or analogous articles, the combination of a support for the blanks to be infolded, a pattern-gage constructed and fitted to move inwardly and outwardly and capable of an up-and-down movement relatively to the support, the said pattern-gage having edge portions adapted to bear directly upon the blanks upon said support, an infolder constructed and fitted to move inwardly and outwardly, and cams actuated by a single part for effecting operations substantially as follows: the pattern-gage moved inwardly and downwardly toward the support to bear upon the blanks, then the infolder moved inwardly to infold edge portions of the blanks over edge portions of the pattern-gage, then the pattern-gage moved inwardly to withdraw from the folds of the blanks, and after that the pattern-gage moved upwardly from the blanks and outwardly, and the infolder moved outwardly, and means for pressing the infolds of the blanks between the infolder and support after the pattern-gage is withdrawn from the infolds, but before the infolder is moved outwardly.

15. In a machine for infolding cuff-blanks or analagous articles the combination of a support for the blanks to be infolded, pattern-gages constructed and fitted to move inwardly and outwardly, actuating mechanism for pattern-gages located outwardly of the respective pattern-gages, infolders adapted to coact with pattern-gages for effecting the infolding of the contiguous edge portions of the blanks, means for producing a relative vertical movement between the said support and pattern-gages whereby the pattern-gages may be caused to bear directly upon the blanks upon the support during the infolding of edge portions of the blanks, and the pattern-gages may be separated from the blanks after the pattern-gages are withdrawn from the infolds of the blanks, so that the folded blanks may be removed from the support, and means for pressing the infolds of the blanks between the support and infolders after the respective pattern-gages are withdrawn from the infolds.

16. In an infolding-machine for cuff-blanks or analogous articles the combination of a support for the blanks to be infolded, a pattern-gage having edge portions adapted to rest directly upon the blanks, a member, as the slide-bar $b^2$, fitted to move in reverse directions, means, as the arm A, connecting the said member and said pattern-gage through which a reciprocating movement may be imparted to said pattern-gage, means whereby the said arm may be moved upwardly and downwardly, the aforesaid movements adapted to effect the positioning of the pattern-gage upon the blanks, the withdrawal thereof from the infolds of the blanks, and the lifting of the pattern-gage from and off the folded blanks; and means whereby edge portions of the blanks may be infolded over edge portions of the pattern-gage.

17. In a machine for infolding cuff-blanks or analogous articles the combination of a support for the blanks to be infolded, and a plurality of distinct apparatuses for bringing about or effecting the infolding of different portions of the blank edges while the blanks remain upon the support, each apparatus being mounted in a position outward of its corresponding blank edge portion and comprising in combination, a pattern-gage having edge portions adapted to bear directly upon the blanks upon said support and constructed and fitted to receive an inward movement from its normal to the proper position upon the blanks, with sufficient downward movement therefor, a further inward movement to effect its removal from the infold, and outward movement to normal, and an infolder constructed and fitted to move inwardly and outwardly whereby it may fold edge portions of the blanks over edge portions of said pattern-gage while the latter rests in position upon the blanks.

18. In a machine for infolding cuff-blanks or analogous articles the combination of a support for the blanks to be infolded, and a plurality of distinct apparatuses for bringing about or effecting the infolding of different portions of the blank edges while the blanks remain upon the support, each apparatus being mounted in a position outward of its corresponding blank edge portion and comprising in combination a pattern-gage having edge portions adapted to bear directly upon the blanks upon said support and constructed and fitted to receive an inward movement from its normal to the proper position upon the blanks, with sufficient downward movement therefor, a further inward movement to effect its removal from the infold, and outward movement to normal; and means for pressing the infold produced by such apparatus, between the infolder thereof and the support, after the removal of the pattern-gage whereby the infold may be creased with a sharp fold.

Signed at Lansingburg, Rensselaer county, State of New York, this 21st day of June, 1900, and in the presence of the two witnesses whose names are hereto written.

GARRY J. DORMANDY.

Witnesses:
 E. O. HOUSE,
 CHARLES S. BRINTNALL.